(12) United States Patent
Pearson et al.

(10) Patent No.: US 12,361,428 B2
(45) Date of Patent: *Jul. 15, 2025

(54) STAGE-SPECIFIC PIPELINE VIEW USING PREDICTION ENGINE

(71) Applicant: Oracle International Corporation, Redwood Shores, CA (US)

(72) Inventors: Mark Pearson, Redwood Shores, CA (US); Jinwon Lee, Seattle, WA (US); Gregory Nerpouni, Oakland, CA (US); Charles Wardin Stabb, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,230

(22) Filed: Oct. 23, 2023

(65) Prior Publication Data

US 2024/0046275 A1 Feb. 8, 2024

Related U.S. Application Data

(63) Continuation of application No. 17/017,567, filed on Sep. 10, 2020, now Pat. No. 11,830,009.
(Continued)

(51) Int. Cl.
*G06Q 10/00* (2023.01)
*G06N 20/00* (2019.01)
(Continued)

(52) U.S. Cl.
CPC .......... *G06Q 20/405* (2013.01); *G06N 20/00* (2019.01); *G06Q 20/4015* (2020.05); *G06Q 20/4093* (2013.01); *G06Q 30/0234* (2013.01)

(58) Field of Classification Search
CPC ............. G06Q 20/405; G06Q 20/4015; G06Q 20/4093; G06Q 30/0234; G06N 20/00
See application file for complete search history.

(56) References Cited

U.S. PATENT DOCUMENTS

| | | |
|---|---|---|
| 7,949,663 B1 | 5/2011 | Cassone et al. |
| 8,224,472 B1 | 7/2012 | Maluf et al. |
| | (Continued) | |

OTHER PUBLICATIONS

Chou, Jui-Sheng, et al. "Visualized EVM system for assessing project performance." Automation in construction 19.5 (2010): 596-607 (Year: 2010).
(Continued)

*Primary Examiner* — Andrew T McIntosh
(74) *Attorney, Agent, or Firm* — Invoke

(57) ABSTRACT

Techniques for displaying a stage-specific pipeline view with a prediction engine are disclosed. A system displays a plurality of regions representing various stages of completion for a plurality of transactions. The system determines a stage of completion for each of the plurality of transactions at a first point-in-time, and generates and displays visualizations representing each of the plurality of transactions in one of the plurality of regions based on the respective current stage of completion. Generating a visualization representing a first transaction includes determining a likelihood of the first transaction completing a stage associated with the first transaction. The likelihood may be determined by selecting attributes associated with the first transaction and identifying prior transactions with similar attributes. The system may compute the likelihood of the first transaction completing the stage based on completion rates associated with the prior transactions, and select the visualization based on the computed likelihood.

20 Claims, 6 Drawing Sheets

Related U.S. Application Data

(60) Provisional application No. 62/900,504, filed on Sep. 14, 2019.

(51) Int. Cl.
*G06Q 20/40* (2012.01)
*G06Q 30/0234* (2023.01)

(56) References Cited

U.S. PATENT DOCUMENTS

| | | |
|---|---|---|
| 10,832,197 B1 | 11/2020 | Effler |
| 2006/0044307 A1* | 3/2006 | Song .................... G06T 11/206 345/419 |
| 2016/0140577 A1* | 5/2016 | Morley ............. G06Q 30/0201 705/7.31 |
| 2016/0283878 A1* | 9/2016 | Nathanson ....... G06Q 10/06314 |
| 2017/0169383 A1* | 6/2017 | Schmidt ......... G06Q 10/063114 |
| 2018/0088939 A1 | 3/2018 | Strachan et al. |
| 2018/0150783 A1* | 5/2018 | Xu .......................... G06N 3/044 |
| 2021/0035017 A1* | 2/2021 | Catterson ............... G06N 20/00 |

OTHER PUBLICATIONS

Hansen, Kai T. "Project visualization for software." IEEE software 23.4 (2006): 84-92 (Year: 2006).

Schulz, Hans-Jörg, et al. "A design space of visualization tasks." IEEE Transactions on Visualization and Computer Graphics 19.12 (2013): 2366-2375 (Year: 2013).

Songer, Anthony D., Benjamin Hays, and Christopher North. "Multidimensional visualization of project control data." Construction Innovation 4.3 (2004): 173-190 (Year: 2004).

Zhang, Ping, and Zhu Dan. Information visualization in project management and scheduling. SSRN, 2013 (Year: 2013).

* cited by examiner

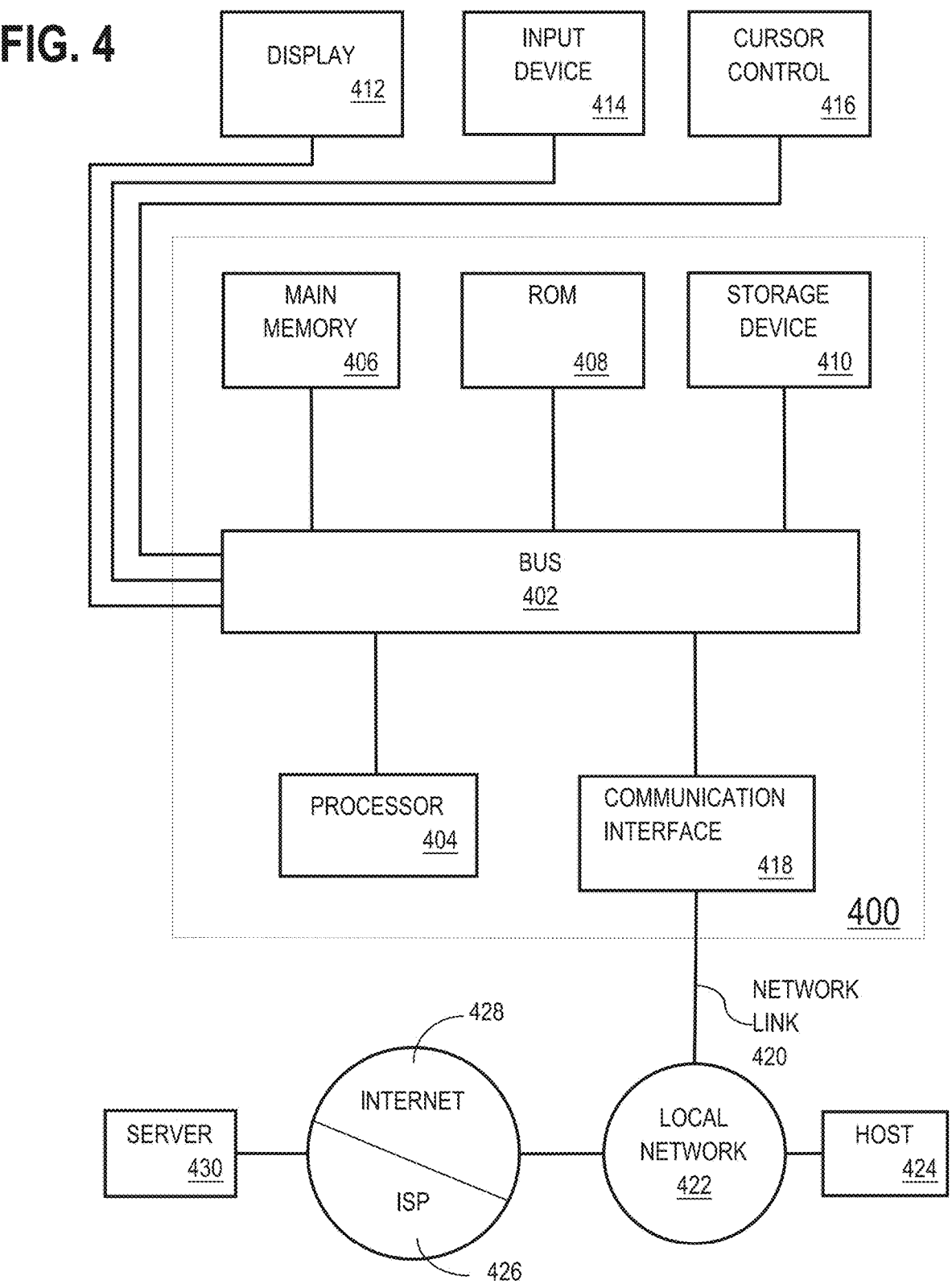

STAGE-SPECIFIC PIPELINE VIEW USING PREDICTION ENGINE

INCORPORATION BY REFERENCE; DISCLAIMER

Each of the following applications are hereby incorporated by reference: application Ser. No. 17/017,567 filed on Sep. 10, 2020; application No. 62/900,504 filed on Sep. 14, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to dashboards. In particular, the present disclosure relates to dashboards with a pipeline view and prediction engine.

BACKGROUND

A dashboard is a type of graphical user interface which provides at-a-glance views of key performance indicators relevant to a particular objective or business process. The dashboard is often displayed on a web page which is linked to a data source that allows the report to be regularly updated. Dashboards may be laid out to track the flows inherent in the business processes that they monitor. Specialized dashboards may track various corporate functions, including human resources, recruiting, sales, operations, security, information technology, project management, and customer relationship management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
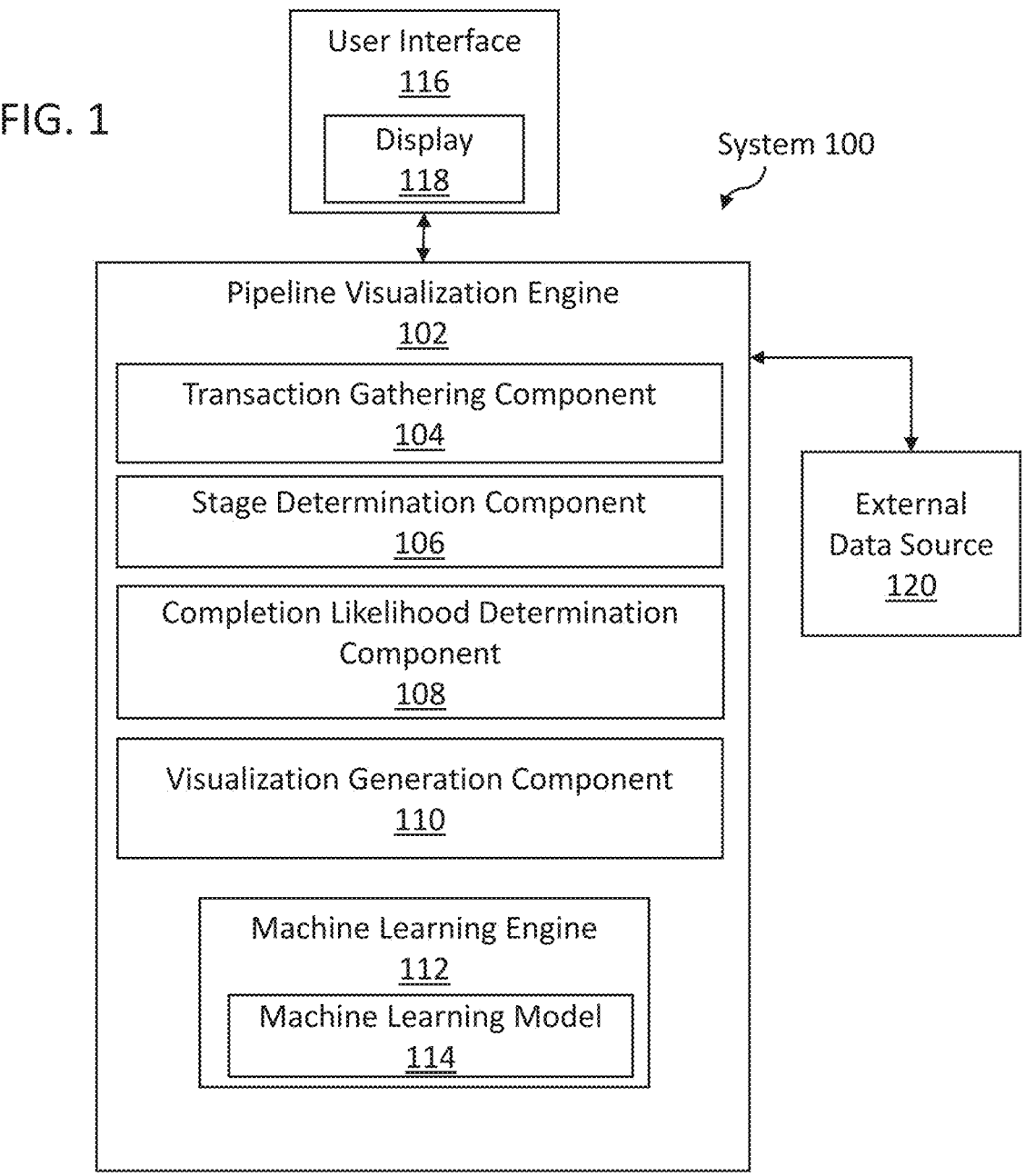
FIG. 1 illustrates a pipeline visualization system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STAGE SPECIFIC PIPELINE VIEW ARCHITECTURE
3. DISPLAYING A STAGE-SPECIFIC PIPELINE VIEW USING A PREDICTION ENGINE
4. MISCELLANEOUS; EXTENSIONS
5. HARDWARE OVERVIEW

1. General Overview

One or more embodiments include techniques for displaying a stage-specific pipeline view using a prediction engine are disclosed. A system may display a plurality of regions respectively representing various stages of completion for a plurality of transactions at a first point-in-time. The system may determine a stage of completion for each of the plurality of transactions at the first point-in-time, and may generate and display visualizations representing each of the plurality of transactions in one of the plurality of regions based on the respective current stage of completion.

Generating a visualization for representing a first transaction, of the plurality of transactions, includes determining a likelihood of the first transaction, of the plurality of transactions, completing a first stage currently associated with the first transaction. The likelihood may be determined by computing a first set of attributes associated with the first transaction and identifying a plurality of prior transactions with a corresponding set of attributes, when the prior transactions were at the first stage, that meet a similarity criterion in relation to the first set of attributes associated with the first transaction. The system may determine completion rates, associated with the plurality of prior transactions, for completion of the first stage, compute the likelihood of the first transaction completing the first stage based on the completion rates associated with the plurality of prior transactions, and select the visualization, for representing the first transaction in a representation of the first stage, based on the likelihood of the first transaction completing the first stage.

The system may use machine learning to determine attributes of the first transaction, including a likelihood that the first transaction will complete a pipeline stage with which the transaction has been associated. The system may determine one or more similarity criteria for comparing the first transaction to a plurality of historical transactions. The system may compare the first transaction to historical data of a plurality of identified past transactions based on one or more transaction attributes. A likelihood of the particular transaction completing the stage of the pipeline in the specified time period can be determined based on a percentage of historical transactions, having similar attributes, which completed the pipeline stage within the specified time period.

One or more embodiments described in this Specification and/or recited in the claims may not be included in this General Overview section.

2. Stage Specific Pipeline View Architecture

FIG. 1 illustrates a system 100 in accordance with one or more embodiments. As illustrated in FIG. 1, system 100 includes a pipeline visualization engine 102, a user interface 116, an external data source 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 116 refers to hardware and/or software configured to facilitate communications between a user and the search result association engine 102. The user interface 116 may be used by a user who accesses an interface (e.g., a dashboard interface) for work and/or personal activities. The user interface 116 may be associated with one or more devices for presenting visual media, such as a display 118, including a monitor, a television, a projector, and/or the like. User interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 116 is specified in one or more other languages, such as Java, C, or C++.

In one or more embodiments, a pipeline visualization engine 102 refers to hardware and/or software configured to perform operations described herein for displaying a pipeline representing transaction completion stages to a user. Examples of operations for displaying the pipeline to a user are described below with reference to FIG. 2.

In an embodiment, the pipeline visualization engine 102 includes a transaction gathering component 104. A transaction gathering component 104 may refer to hardware and/or software configured to perform operations described herein (including such operations as may be incorporated by reference) for retrieving one or more transactions for analysis by the pipeline visualization engine 102.

In an embodiment, the pipeline visualization engine 102 includes a stage determining component 106. A stage determining component 106 may refer to hardware and/or software configured to determine a stage of a particular transaction from among the gathered transactions.

In an embodiment, the pipeline visualization engine 102 includes a completion likelihood determination component 108. A completion likelihood determination component 108 may refer to hardware and/or software configured to determine a likelihood that a particular transaction from among the gathered transactions will complete the determined stage within a particular amount of time.

In an embodiment, the search result association engine 102 includes a visualization generation component 110. A visualization generation component 110 may refer to hardware and/or software configured to generate a visualization of the particular transaction based at least in part on the stage associated with the transaction and the likelihood that the particular transaction will complete the particular stage in a particular amount of time.

In an embodiment, one or more components of the search result association engine 102 use a machine learning engine 112. Machine learning includes various techniques in the field of artificial intelligence that deal with computer-implemented, user-independent processes for solving problems that have variable inputs.

In some embodiments, the machine learning engine 112 trains a machine learning model 114 to perform one or more operations. Training a machine learning model 114 uses training data to generate a function that, given one or more inputs to the machine learning model 114, computes a corresponding output. The output may correspond to a prediction based on prior machine learning. In an embodiment, the output includes a label, classification, and/or categorization assigned to the provided input(s). The machine learning model 114 corresponds to a learned model for performing the desired operation(s) (e.g., labeling, classifying, and/or categorizing inputs). For example, the machine learning model 112 may be used in determining a likelihood of a transaction to complete a stage in particular amount of time.

In an embodiment, the machine learning engine 112 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 108 receives positive and/or negative reinforcement in the process of attempting to solve a particular problem (e.g., to optimize performance in a particular scenario, according to one or more predefined performance criteria). In an embodiment, the machine learning engine 112 initially uses supervised learning to train the machine learning model 114 and then uses unsupervised learning to update the machine learning model 114 on an ongoing basis.

In an embodiment, a machine learning engine 112 may use many different techniques to label, classify, and/or categorize inputs. A machine learning engine 112 may transform inputs into feature vectors that describe one or more properties ("features") of the inputs. The machine learning engine 112 may label, classify, and/or categorize the inputs based on the feature vectors. Alternatively or additionally, a machine learning engine 112 may use clustering (also referred to as cluster analysis) to identify commonalities in the inputs. The machine learning engine 112 may group (i.e., cluster) the inputs based on those commonalities. The machine learning engine 112 may use hierarchical clustering, k-means clustering, and/or another clustering method or combination thereof. In an embodiment, a machine learning engine 112 includes an artificial neural network. An artificial neural network includes multiple nodes (also referred to as artificial neurons) and edges between nodes. Edges may be associated with corresponding weights that represent the strengths of connections between nodes, which the machine learning engine 112 adjusts as machine learning proceeds. Alternatively or additionally, a machine learning engine 112 may include a support vector machine. A support vector machine represents inputs as vectors. The machine learning engine 112 may label, classify, and/or categorizes inputs based on the vectors. Alternatively or additionally, the machine learning engine 112 may use a naïve Bayes classifier to label, classify, and/or categorize inputs. Alternatively or additionally, given a particular input, a machine learning model may apply a decision tree to predict an output for the given input. Alternatively or additionally, a machine learning engine 112 may apply fuzzy logic in situations where labeling, classifying, and/or categorizing an input among a fixed set of mutually exclusive options is impossible or impractical. The aforementioned machine learning model 114 and techniques are discussed for exemplary purposes only and should not be construed as limiting one or more embodiments.

In an embodiment, as a machine learning engine 112 applies different inputs to a machine learning model 114, the corresponding outputs are not always accurate. As an example, the machine learning engine 112 may use supervised learning to train a machine learning model 114. After training the machine learning model 114, if a subsequent input is identical to an input that was included in labeled training data and the output is identical to the supervisory signal in the training data, then output is certain to be accurate. If an input is different from inputs that were included in labeled training data, then the machine learning engine 112 may generate a corresponding output that is inaccurate or of uncertain accuracy. In addition to producing a particular output for a given input, the machine learning engine 112 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the pipeline visualization engine 102 is configured to receive data from one or more external data sources 120. An external data source 120 refers to hardware and/or software operating independent of the search result association engine 102. For example, the hardware and/or software of the external data source 120 may be under control of a different entity (e.g., a different company or other kind of organization) than an entity that controls the query suggestion engine. An external data source 120 may store transaction data associated with one or more currently pending transactions and/or one or more potential transactions. An example of an external data source 120 supplying data to a pipeline visualization engine 102 may include a third party database. Many different kinds of external data sources 120 may supply many different kinds of data.

In an embodiment, pipeline visualization engine 102 is configured to retrieve data from an external data source 120 by 'pulling' the data via an application programming interface (API) of the external data source 120, using user credentials that a user has provided for that particular external data source 120. Alternatively or additionally, an external data source 120 may be configured to 'push' data to the pipeline visualization engine 102 via an API of the query suggestion service, using an access key, password, and/or other kind of credential that a user has supplied to the external data source 120. A pipeline visualization engine 102 may be configured to receive data from an external data source 120 in many different ways.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Displaying a Stage-Specific Pipeline View Using a Prediction Engine

Figure 2:
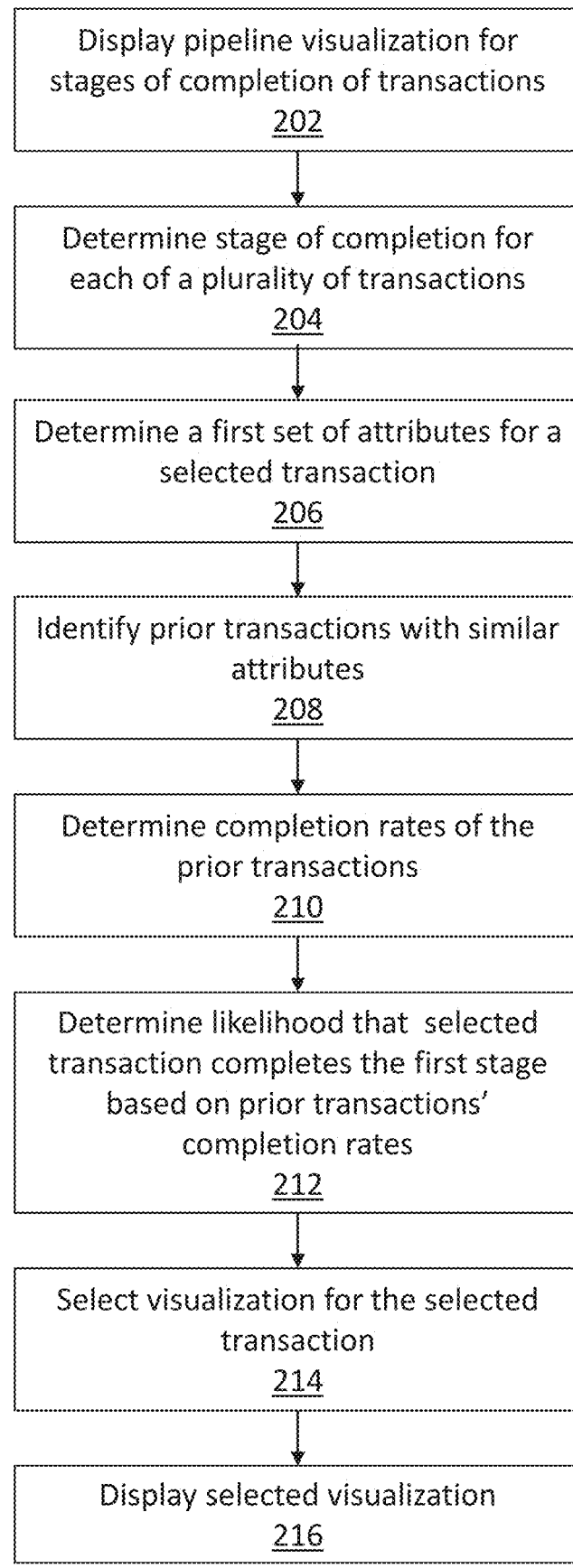
FIG. 2 illustrates an example set of operations for displaying a stage-specific pipeline view using a prediction engine in accordance with one or more embodiments.

FIG. 2 illustrates an example set of operations for displaying a stage-specific pipeline view with a prediction engine in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Figure 3A:
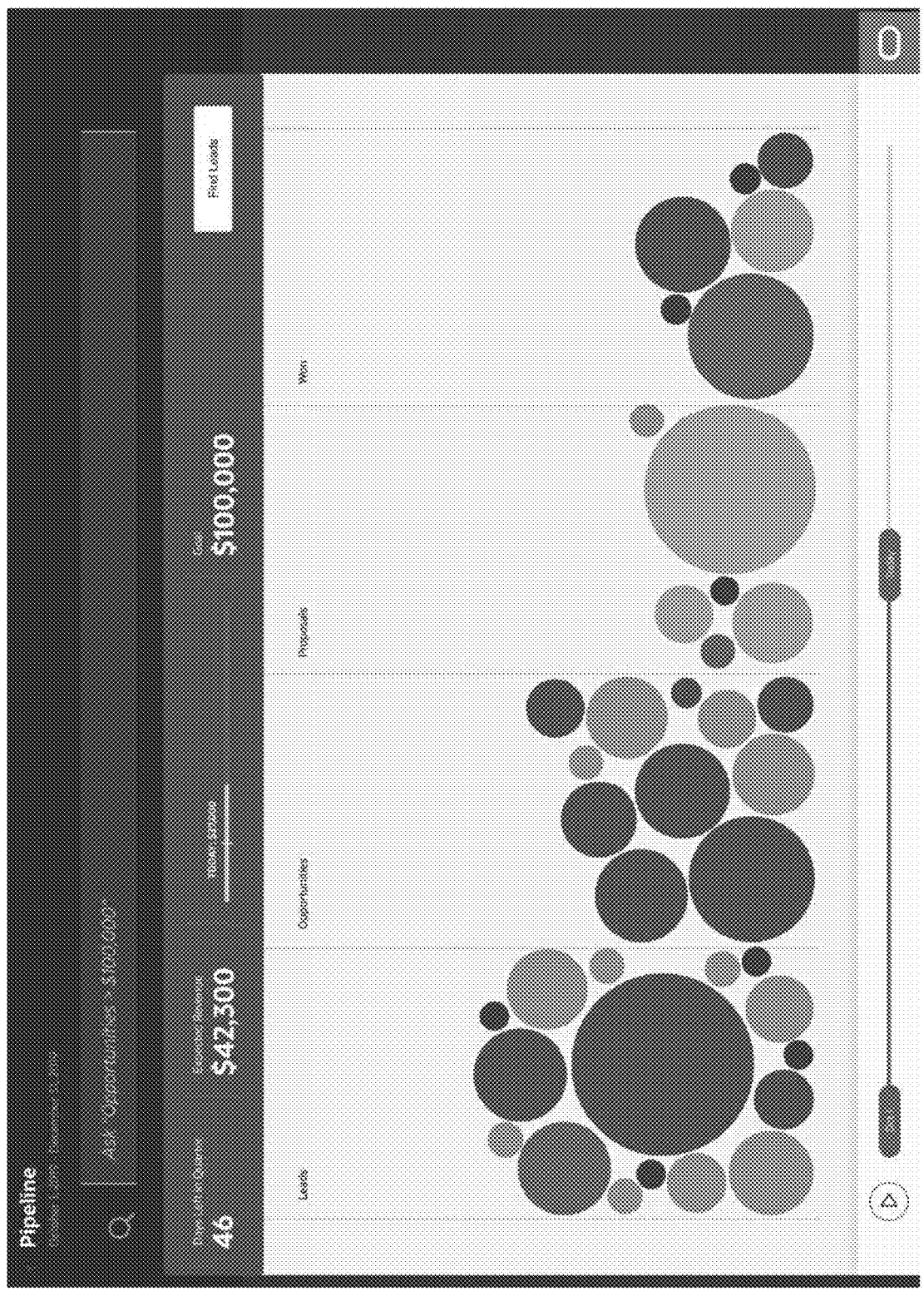
FIGS. 3A-3C show examples of a dashboard including a stage-specific pipeline view using a prediction engine in accordance with one or more embodiments.

In embodiments, a system, such as a dashboard display system, may display a dashboard including a pipeline visualizer for displaying projects (such as sales transactions) in multiple stages of completion (Operation 202). For example, the system may include a display device configured to display the dashboard to a user. In some embodiments, the pipeline may be divided into multiple stages horizontally (e.g., along the x-axis). For example, as shown in FIG. 3A, the pipeline can comprise four segments for displaying sales transactions, including "Leads," "Opportunities," "Proposals," and "Won." In some aspects, the pipeline visualization may include a particular pipeline stage and a plurality of substages associated with the particular pipeline stage.

The pipeline display may also include a timeline illustrating at least a particular point-in-time. The particular point in time may be the present time, a point-in-time in the past (e.g., before the present time), or a point0in-time in the future (e.g., after the present time). In embodiments, the user may adjust a marker on the timeline to select a point-in-time as the particular point-in-time.

In embodiments, the system may receive, as input, a plurality of transactions. In some embodiments, the plurality of transactions is received in response to a user request for transactions. Each of the transactions received as input may be associated with the user (e.g., the user has performed some amount of work associated with the transaction and/or the transaction has been assigned to the user). Additionally or alternatively, the system may include one or more transactions that is not associated with the user. For example, the system may include one or more transactions not associated with any user (e.g., a transaction that no user has performed work on and/or that has not been assigned to any user). In some embodiments, the received input may include one or more transaction attributes (e.g., transactions associated with a particular pipeline stage, transactions having a particular dollar value).

Each transaction may include data specifying one or more characteristics of the transaction. For example, each transaction may include data specifying a transaction dollar amount, a party associated with the transaction, and/or a contact associated with the transaction. In embodiments, the transaction may include data indicating a most recent communication with the contact and/or data indicating a frequency of communication with the contact.

In some embodiments, the plurality of transactions may be received from one or more external data sources. The system may be configured to retrieve at least a subset of the plurality of transactions from an external data source by 'pulling' the transaction data via an application programming interface (API) of the external data source, using user credentials that a user has provided for that particular external data source. Alternatively or additionally, an external data source may be configured to 'push' at least a subset of the plurality of transactions to the system. The transaction data may be pushed to the system via an API of the system, using an access key, password, and/or other kind of credential that a user has supplied to the external data source.

In some embodiments, the pipeline visualization may include additional information. The additional information may include aggregate information associated with the plurality of transactions and/or user-associated information. For example, as shown in FIG. 3A, the pipeline visualization includes aggregate information of an expected revenue figure and user-associated information including a sales goal of $100.00 and a number of days left in the current sales quarter.

The system may determine a stage of completion for a particular transaction of the plurality of transactions at the particular point-in-time (Operation 204). In some embodiments, the particular point-in-time may be the present time or a point in time prior to the present time. In embodiments, the particular transaction can be associated with a stage of the pipeline. For example, as shown in FIG. 3A, the particular transaction can be associated with a particular stage of the pipeline (e.g., one of "Leads," "Opportunities," "Proposals," or "Won."). For example, the particular transaction can include metadata indicating completeness of the transaction.

In embodiments, the particular point-in-time may be in the future. The determined stage of completion for a point-in-time in the future may be determined by one or more of a conversion rate associated with the particular user, a conversion rate associated with a company at which the particular user works, and/or a conversion rate associated with deals having a dollar value similar to the dollar value of the particular deal. Many factors may be used when determining the conversion rate.

The system may determine a likelihood that the particular transaction will complete the stage of the pipeline with which the particular transaction has been associated In particular, the system may specify a time period, and may determine a likelihood that the particular transaction will complete the stage of the pipeline in the specified time period. In embodiments, machine learning can be used to determine a likelihood that the particular transaction will complete the stage of the pipeline in the specified time period. For example, the system may compare the particular transaction to historical data of a plurality of past transactions based on one or more transaction attributes. A likelihood of the particular transaction completing the stage of the pipeline in the specified time period can be determined based on a percentage of historical transactions, having similar attributes, which completed the pipeline stage within the specified time period.

As part of generating a visualization, the system may determine a first set of associated with the particular transaction (Operation 206). For example, the system may read or otherwise decode the attributes from a data source. In some embodiments, the attributes can be stored together with the associated transactions. The attributes may include, for example, one or more of a dollar value associated with the transaction, a client associated with the transaction, an indicator of how recently the client was contacted, or an indicator of how frequently the client is contacted. Many different types of data may be maintained in the first set of attributes.

In embodiments, the system may identify one or more prior transactions having similar attributes to those of the selected transaction (Operation 208). The system may identify attributes of the prior transaction based on the attributes of the prior transactions at the time the transaction entered the stage of the pipeline corresponding to the stage of the pipeline associated with the particular transaction (e.g., if the particular transaction is associated with the "Proposals" stage, the system may determine attributes of the prior transactions at the time the prior transactions entered the "Proposals" stage). Identifying the one or more prior transactions may include determining one or more similarity criteria for identifying the prior transactions. Many different kinds of similarity criteria may be defined. In an embodiment, a system may use a machine learning engine to determine similarity criteria as part of a machine learning model in a machine learning engine.

In an embodiment, a machine learning engine may use many different techniques to label, classify, and/or categorize the particular transaction and the one or more historical transactions as inputs. A machine learning engine may transform the inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

The system may further determine completion rates of the identified prior transactions (Operation 210). In some embodiments, the completion rate of each prior transaction can be stored as a portion of the attributes of the prior transaction. As an example, for a pipeline that includes four stages, the attributes of the prior transactions may include a length of time to complete the first stage, a length of time to complete the second stage, a length of time to complete the third stage, and a length of time to complete the fourth stage.

In embodiments, the system may compute a likelihood of the first transaction completing the first stage (Operation 212). In some embodiments, the likelihood is computed based on the completion rates associated with eh one or more prior transactions. For example, in some embodiments, the completion rate may be computed as an average of the completion rates of the prior transactions. As another example, the likelihood of the first transaction completing the first stage can be computed as a weighted average of the completion rates of the prior transactions, where weights are assigned to the prior transactions based on similarity to the first transaction.

Figure 3B:
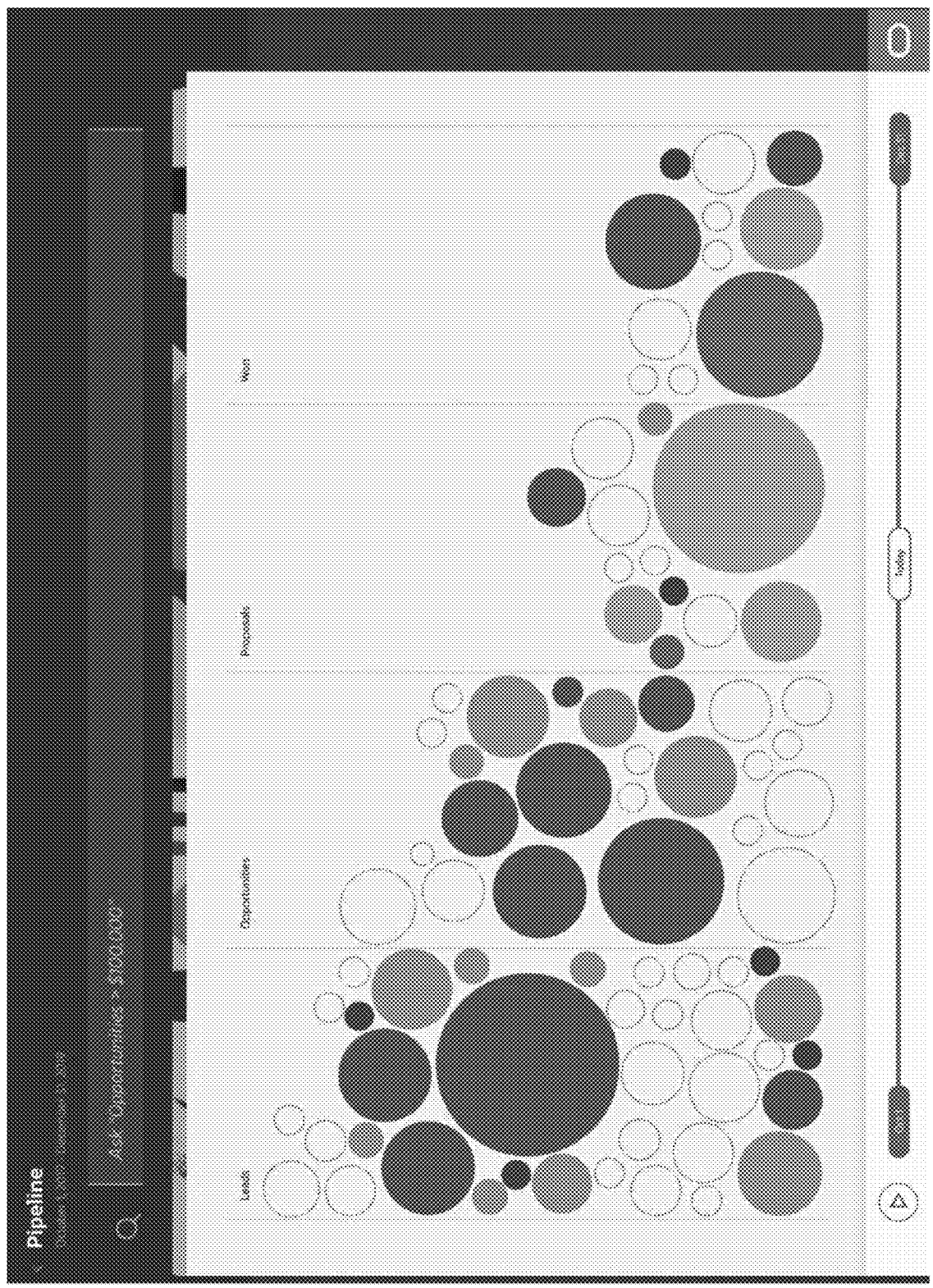

In embodiments a visualization can be selected for the particular transaction (Operation 214). The visualization may include an icon that represents the transaction visually, wherein aspects of the icon can be varied based on attributes of the particular transaction. For example, an icon size, an icon color, and/or an icon outline can be varied according to one or more attributes of the particular transaction. In some embodiments, characteristics of the visualization can be selected at least in part, based on the likelihood of the first transaction completing the first stage, as computed in Operation 212. For example, one or more of a size of the visualization and a color of the visualization can be selected based on the computed likelihood. In embodiments, additional attributes of the particular transaction, such as transaction dollar amount, the frequency of communication with the company associated with the transaction, and/or the freshness of the transaction can be considered when determining characteristics of the visualization. As a particular example, a color (e.g., a hue, shade, or tint) and/or pattern associated with the visualization of the particular transaction may be selected based on the computed likelihood that the particular transaction will complete the associated pipeline stage, and a size associated with the visualization may be selected based on a dollar value associated with the particular transaction. In some embodiments, a line style associated with the visualization can further be selected as part of selecting the visualization. For example, transactions that have not yet been realized may use a dashed line style, while realized transactions use a solid line style. As an example, FIG. 3B shows a pipeline view including visualizations of transactions that have not yet been realized using a dashed line style, while realized transactions use a solid line style. Additionally, FIG. 3B shows visualizations of realized transactions are shown having different colors corresponding to likelihood that the transaction will complete the current pipeline stage, and different sizes based on the transaction amount. Many different visualization characteristics can be determined based on attributes of the first transaction.

Finally, the visualized transaction can be displayed on the pipeline view (Operation 216). As an example, the visualized transaction can be displayed concurrently with the pipeline view, such that the visualized transaction appears to be in the pipeline.

In embodiments of the invention, this process can be repeated multiple times for different transactions. For example, the process can be repeated until all transactions received as input have been visualized. As an example, FIG. 3B shows a pipeline view that includes numerous transaction visualizations displayed concurrently.

Additionally, the system may receive input from a user indicating a different point-in-time. In some embodiments, the input can comprise a user interacting with the timeline to select a point along the timeline. For example, the user may click and drag a time marker on the timeline to the different point-in-time.

In some embodiments the different point in time can be prior to the first point-in-time. The system may refresh the display of the pipeline view and the visualizations of the transactions based on the different point-in-time.

In some embodiments, the different point in time can be subsequent to the first point in time and indicate a time that has not yet occurred (e.g., it is a point-in-time in the future). The system may estimate a stage of completion for each transaction at the different point in time. For example, the system may use a machine learning model to estimate the stage of completion for each of the respective transactions. The system may further refresh the display of the pipeline and the visualizations of the transactions based on the estimated stage of completion for each of the transactions.

Figure 3C:
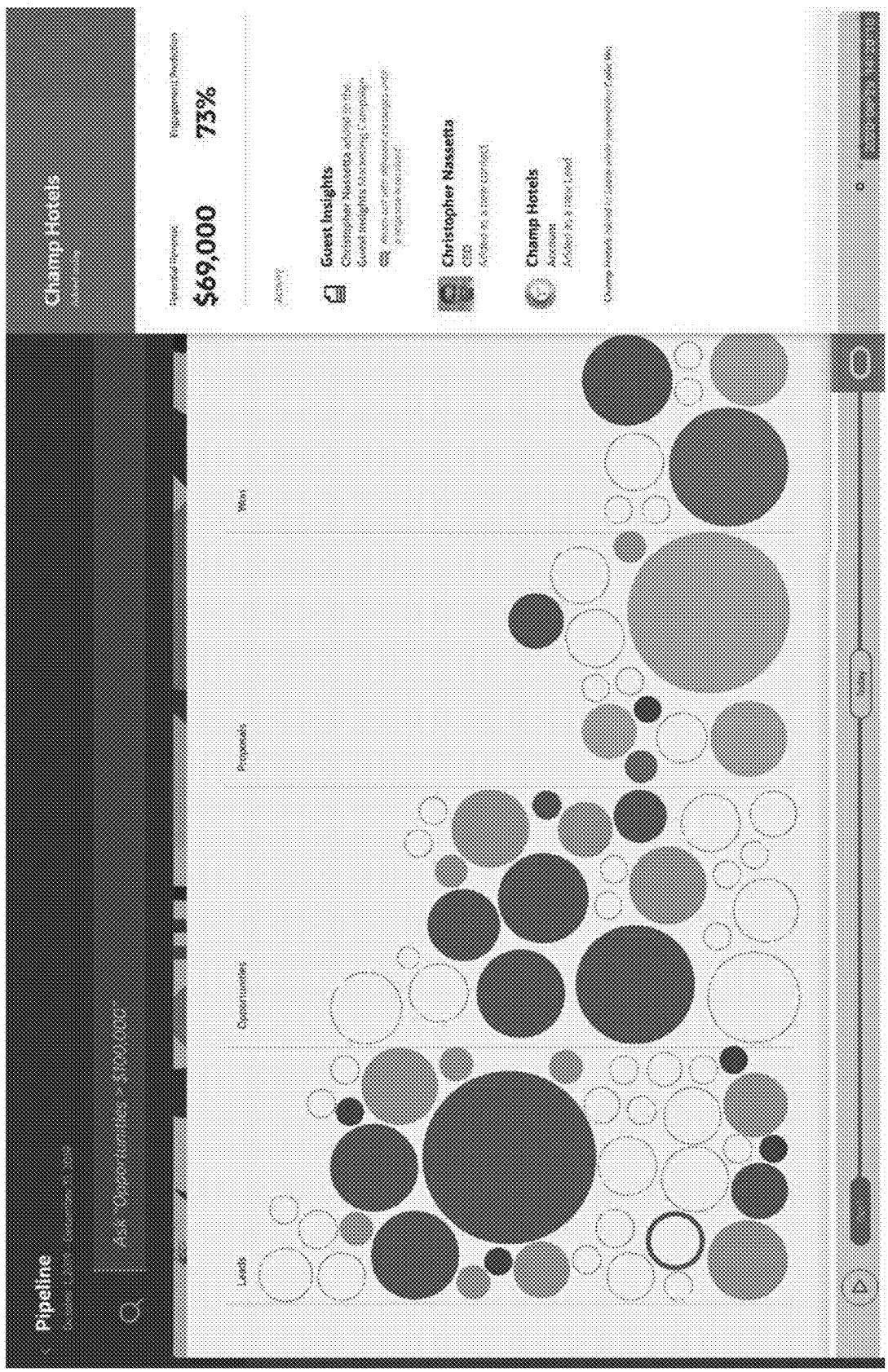

In some embodiments, a user can select a displayed visualization of a transaction. In response to the user making such a selection, the system can display information related to the transaction. As a specific example, FIG. 3C shows transactions details related to a selected transaction visualization. In embodiments. the visualized transactions may be positioned randomly within their assigned pipeline stages, as shown in FIG. 3C. Alternatively, the transactions assigned to a particular pipeline stage may be sorted based on one or more transaction attributes.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory media comprising instructions which, when executed by one or more hardware processors, cause performance of operations comprising:
    displaying a plurality of regions respectively representing a plurality of stages for a plurality of transactions;
    for each particular transaction of the plurality of transactions:
        determining a first respective stage of the particular transaction at a first point-in-time;
        determining a respective likelihood of the particular transaction completing the first respective stage;
        displaying a first visualization representing the particular transaction in a first respective region of the plurality of regions that corresponds to the first respective stage, based at least in part on the respective likelihood of the particular transaction completing the first respective stage;
        determining a second respective stage of the particular transaction at a second point-in-time;
        displaying a second visualization representing the particular transaction in a second respective region of the plurality of regions that corresponds to the second respective stage.

2. The one or more media of claim 1, wherein determining the respective likelihood of the particular transaction completing the first respective stage comprises:
    identifying a subset of a plurality of prior transactions such that (a) one or more attributes associated with the particular transaction satisfy one or more similarity criteria with respect to (b) one or more corresponding attributes associated the subset of the plurality of transactions when the subset of the plurality of transactions were at the first respective stage;
    computing the respective likelihood of the particular transaction completing the first respective stage, based at least in part on a completion rate associated with the subset of the plurality of prior transactions completing the first respective stage.

3. The one or more media of claim 2, wherein machine learning is used to select the one or more similarity criteria.

4. The one or more media of claim 2, wherein machine learning is used to identify the subset of the plurality of prior transactions.

5. The one or more media of claim 1, the operations further comprising:
    determining, based at least in part on the respective likelihood of the particular transaction completing the first respective stage, one or more of: a size of the first visualization or a color of the first visualization.

6. The one or more media of claim 1, the operations further comprising:
    determining, based at least in part on an estimated financial reward for completing the particular transaction, one or more of: a size of the first visualization or a color of the first visualization.

7. The one or more media of claim 1, wherein the respective likelihood of the particular transaction completing the first respective stage is determined based at least in part on a recency of contact with a customer associated with the particular transaction.

8. A system comprising:
    one or more hardware processors;
    one or more non-transitory computer-readable media; and
    program instructions stored on the one or more non-transitory computer readable media which, when executed by the one or more hardware processors, cause the system to perform operations comprising:
    displaying a plurality of regions respectively representing a plurality of stages for a plurality of transactions;
    for each particular transaction of the plurality of transactions:
        determining a first respective stage of the particular transaction at a first point-in-time;
        determining a respective likelihood of the particular transaction completing the first respective stage;
        displaying a first visualization representing the particular transaction in a first respective region of the plurality of regions that corresponds to the first respective stage, based at least in part on the respective likelihood of the particular transaction completing the first respective stage;
        determining a second respective stage of the particular transaction at a second point-in-time;
        displaying a second visualization representing the particular transaction in a second respective region of the plurality of regions that corresponds to the second respective stage.

9. The system of claim 8, wherein determining the respective likelihood of the particular transaction completing the first respective stage comprises:
    identifying a subset of a plurality of prior transactions such that (a) one or more attributes associated with the particular transaction satisfy one or more similarity criteria with respect to (b) one or more corresponding attributes associated the subset of the plurality of transactions when the subset of the plurality of transactions were at the first respective stage;
    computing the respective likelihood of the particular transaction completing the first respective stage, based at least in part on a completion rate associated with the subset of the plurality of prior transactions completing the first respective stage.

10. The system of claim 9, wherein machine learning is used to select the one or more similarity criteria.

11. The system of claim 9, wherein machine learning is used to identify the subset of the plurality of prior transactions.

12. The system of claim 8, the operations further comprising:
    determining, based at least in part on the respective likelihood of the particular transaction completing the first respective stage, one or more of: a size of the first visualization or a color of the first visualization.

13. The system of claim 8, the operations further comprising:
   determining, based at least in part on an estimated financial reward for completing the particular transaction, one or more of: a size of the first visualization or a color of the first visualization.

14. The system of claim 8, wherein the respective likelihood of the particular transaction completing the first respective stage is determined based at least in part on a recency of contact with a customer associated with the particular transaction.

15. A method comprising:
   displaying a plurality of regions respectively representing a plurality of stages for a plurality of transactions;
   for each particular transaction of the plurality of transactions:
      determining a first respective stage of the particular transaction at a first point-in-time;
      determining a respective likelihood of the particular transaction completing the first respective stage;
      displaying a first visualization representing the particular transaction in a first respective region of the plurality of regions that corresponds to the first respective stage, based at least in part on the respective likelihood of the particular transaction completing the first respective stage;
      determining a second respective stage of the particular transaction at a second point-in-time;
      displaying a second visualization representing the particular transaction in a second respective region of the plurality of regions that corresponds to the second respective stage;
   wherein the method is performed by at least one device including a hardware processor.

16. The method of claim 15, wherein determining the respective likelihood of the particular transaction completing the first respective stage comprises:
   identifying a subset of a plurality of prior transactions such that (a) one or more attributes associated with the particular transaction satisfy one or more similarity criteria with respect to (b) one or more corresponding attributes associated the subset of the plurality of transactions when the subset of the plurality of transactions were at the first respective stage;
   computing the respective likelihood of the particular transaction completing the first respective stage, based at least in part on a completion rate associated with the subset of the plurality of prior transactions completing the first respective stage.

17. The method of claim 16, wherein machine learning is used to select the one or more similarity criteria.

18. The method of claim 16, wherein machine learning is used to identify the subset of the plurality of prior transactions.

19. The method of claim 15, further comprising:
   determining, based at least in part on the respective likelihood of the particular transaction completing the first respective stage, one or more of: a size of the first visualization or a color of the first visualization.

20. The method of claim 15, further comprising:
   determining, based at least in part on an estimated financial reward for completing the particular transaction, one or more of: a size of the first visualization or a color of the first visualization.

* * * * *